United States Patent
Oshinsky et al.

(10) Patent No.: US 8,222,995 B1
(45) Date of Patent: *Jul. 17, 2012

(54) SYSTEM AND METHOD FOR TRANSMITTING MESSAGES RECEIVED FROM A PAGING NETWORK ON A PAGING DEVICE TO ELECTRONIC DEVICES

(75) Inventors: Stephen Oshinsky, Madison, MS (US); Ed Meyercord, Princeton, NJ (US); Ted McNaught, Windham, ME (US)

(73) Assignee: Critical Alert Systems, LLC, Westbrook, ME (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/289,880

(22) Filed: Nov. 4, 2011

Related U.S. Application Data

(63) Continuation of application No. 12/984,598, filed on Jan. 4, 2011.

(51) Int. Cl.
*G08B 5/22* (2006.01)
(52) U.S. Cl. ..................... 340/7.55; 340/7.54
(58) Field of Classification Search ........... 340/7.55, 340/7.74, 7.44; 455/41.2, 426.1
See application file for complete search history.

(56) References Cited

U.S. PATENT DOCUMENTS

| | | | |
|---|---|---|---|
| H610 H | 3/1989 | Focarile et al. | |
| 4,940,963 A | 7/1990 | Gutman et al. | |
| RE33,417 E | 10/1990 | Bhagat et al. | |
| 5,109,400 A | 4/1992 | Patsiokas et al. | |
| 5,117,449 A | 5/1992 | Metroka et al. | |
| 5,148,473 A | 9/1992 | Freeland et al. | |
| 5,153,903 A | 10/1992 | Eastmond et al. | |
| 5,175,758 A | 12/1992 | Levanto et al. | |
| 5,247,700 A | 9/1993 | Wohl et al. | |
| 5,392,452 A | 2/1995 | Davis | |
| 5,414,750 A | 5/1995 | Bhagat et al. | |
| 5,497,339 A | 3/1996 | Bernard | |
| 5,513,241 A | 4/1996 | Dimitriadis et al. | |
| 5,526,398 A | 6/1996 | Okada et al. | |
| 5,541,976 A | 7/1996 | Ghisler | |
| 5,559,862 A | 9/1996 | Bhagat et al. | |
| 5,638,450 A | 6/1997 | Robson | |
| 5,675,524 A | 10/1997 | Bernard | |
| 5,701,337 A | 12/1997 | Silver et al. | |

(Continued)

FOREIGN PATENT DOCUMENTS

DE 19721127 12/1997

(Continued)

OTHER PUBLICATIONS

Donovon, Synapse Pager Card, Northcon/98 Conference Proceedings 1998, pp. 98-103.

Eisenberg, Message From the Wilderness, via Satellite, The New York Times [online], Jan. 29, 2011 [retrieved on Jan. 31, 2011]. Retrieved from the Internet: <URL: http://www.nytimes.com/2011/01/30/business/30novel.html? r=1.

(Continued)

*Primary Examiner* — Vernal Brown
(74) *Attorney, Agent, or Firm* — Bryan Cave LLP

(57) ABSTRACT

Systems, methods, and media are provided for transmitting a message received from a paging network on a paging device to wireless or other electronic devices. The paging device establishes a radio connection with the wireless device and transmits the received messages to the wireless device through the established radio connection. In response to receiving a message from the paging device, the wireless device sends an acknowledgment to the paging network that the message was received and displays the message.

30 Claims, 10 Drawing Sheets

U.S. PATENT DOCUMENTS

| | | | |
|---|---|---|---|
| 5,729,590 | A | 3/1998 | Dimitriadis et al. |
| 5,737,707 | A | 4/1998 | Gaulke et al. |
| 5,802,470 | A | 9/1998 | Gaulke et al. |
| 5,828,949 | A | 10/1998 | Silver et al. |
| 5,854,984 | A | 12/1998 | Buhrmann et al. |
| 5,884,188 | A | 3/1999 | Hayes, Jr. |
| 5,898,758 | A | 4/1999 | Rosenberg |
| 5,950,128 | A | 9/1999 | Ghisler |
| 5,973,613 | A | 10/1999 | Reis et al. |
| 6,002,945 | A | 12/1999 | McDuffee |
| 6,009,309 | A | 12/1999 | Okada et al. |
| 6,134,436 | A | 10/2000 | Ezaki |
| 6,188,907 | B1 | 2/2001 | Reding et al. |
| 6,329,902 | B1 | 12/2001 | Lee et al. |
| 6,377,798 | B1 | 4/2002 | Shaffer et al. |
| 6,434,395 | B1 | 8/2002 | Lubin et al. |
| 6,522,879 | B2 | 2/2003 | Myer et al. |
| 6,542,721 | B2 | 4/2003 | Boesen |
| 6,653,816 | B2 | 11/2003 | Peek et al. |
| 6,757,551 | B2 | 6/2004 | Newman et al. |
| 6,760,600 | B2 | 7/2004 | Nickum |
| 6,934,560 | B2 | 8/2005 | Chuang |
| 7,352,998 | B2 * | 4/2008 | Palin et al. .................. 455/41.2 |
| 2011/0096706 | A1 | 4/2011 | Ramasamy et al. |

FOREIGN PATENT DOCUMENTS

| | | |
|---|---|---|
| EP | 0503813 | 9/1992 |
| GB | 2269072 | 1/1994 |
| GB | 2421659 | 6/2006 |
| WO | WO 92/04797 | 3/1992 |
| WO | WO 94/13070 | 6/1994 |
| WO | WO 95/26113 | 9/1995 |
| WO | WO 97/03534 | 1/1997 |
| WO | WO 98/21898 | 5/1998 |
| WO | WO 01/89246 | 11/2001 |
| WO | WO 2011/050195 | 4/2011 |

OTHER PUBLICATIONS

Apple acquires paging patent to assist enterprise and medical complexes [online], May 2, 2011 [retrieved on Jan. 31, 2011]. Retrieved from the Internet: <URL:http://macdailynews.com/2011/05/02/apple-acquires-paging-patent-to-assist-enterprise-and-medical-complexes/?utm_source=feedburner&utm_medium=feed&utm_campaign=Feed%3A+wordpress%FxhfA+%28MacDailyNews%29.

Sprint's ZTE Peel Case Turns Your iPod Touch Into a Cheap, Contract-Free iPhone [online], Nov. 10, 2010 [retrieved on Jan. 31, 2011]. Retrieved from the Internet: <URL: http://www.popsci.com/gadgets/article/2010-11/sprints-zte-peel-case-turns-your-ipod-touch-cheap-contract-free-iphone.

2011 CES Unveiled: pipSqueak [online], Jan. 5, 2011 [retrieved on Jan. 31, 2011]. Retrieved from the Internet: <URL: http://www.displayblog.com/2011/01/05/2011-ces-unveiled-pipsqueak/.

pipSqueak!—Cell Phone Management Jewelry [online], Jan. 5, 2011 [retrieved on Jan. 31, 2011]. Retrieved from the Internet: <URL: http://blog.etcenter.org/2011/01/pipsqueak-cell-phone-management-jewelry/.

Welcome to the seekerpnd.com [online], 2010-2011 [retrieved on Jan. 31, 2011]. Retrieved from the Internet: <URL: http://www.seekerpnd.com/.

Notification of Transmittal of the International Search Report and the Written Opinion of the International Searching Authority, or the Declaration, including the International Search Report, and Written Opinion of the International Searching Authority, mailed Apr. 3, 2012.

Invitation to Pay Additional Fees and, Where Applicable, Protest Fee, and Communication Relating to the results of the Partial International Search (PCT/ISA/206), mailed May 21, 2012.

* cited by examiner

SYSTEM AND METHOD FOR TRANSMITTING MESSAGES RECEIVED FROM A PAGING NETWORK ON A PAGING DEVICE TO ELECTRONIC DEVICES

CROSS-REFERENCE TO RELATED APPLICATIONS

The present application claims benefit to and is a continuation application of U.S. patent application Ser. No. 12/984,598, which was filed on Jan. 4, 2011. The contents of the above-identified application is incorporated by reference in its entirety as if recited in full herein.

FIELD OF THE INVENTION

The present invention generally relates to systems and methods for transmitting paging messages from a paging device to electronic devices. More specifically, certain embodiments are directed to systems and methods for establishing a radio connection between a paging device and a wireless device, such as a cellular device, and for transmitting the messages received over a paging network by the paging device to the wireless device for display on the wireless device. Other embodiments are directed to systems and methods for establishing a connection between a paging device and other devices, such as GPS navigation systems, televisions, laptops, and gaming consoles, and for transmitting the messages received over a paging network by the paging device to the such devices.

BACKGROUND OF THE INVENTION

Both pagers and wireless devices, such as cell phones, are widely used forms of communication. Although a few two-way paging systems have been developed, paging systems are typically one-way radio communications systems. In order to send a message to a user who has a paging device, the sender contacts a paging control system, usually via a telephone or computer network. Upon accessing the paging control system, the sender can perform certain operations, including inputting a call-back number or message to be sent to the paging device or leaving a voice message for the paged user. The paging control system can then deliver the call-back number or message or the voice message to the paging device through a paging network, such as POCSAG or FLEX.

Wireless devices, such as cellular telephones, on the other hand, typically communicate through bidirectional communication systems. Many of these devices further allow for real-time bidirectional communication. For example, when an individual wishes to contact a user who has a cellular telephone, the individual usually dials the number associated with the cellular telephone from the individual's cellular or landline telephone. Once a connection is established between the two telephones, voice and other data are transmitted to and from the cellular telephone through a cellular network, such as GSM or CDMA.

The transmitters used in paging systems typically operate at a higher power level than cellular telephone transceivers. As a result, the coverage area associated with individual paging systems is often greater than the coverage area associated with individual cellular telephone, or transmission towers. For similar reasons, paging systems also tend to have greater penetration than cellular telephone systems. Moreover, unlike cellular systems, paging systems have the ability to simulcast transmissions by utilizing constructive interference to strengthen the signal, which further increases the coverage area and penetration of the paging signals. As a result, paging services are frequently available in certain geographic areas and environments where cellular telephone service is not available. Thus, paging systems generally provide increased reliability with respect to the delivery and receipt of communications as compared to cellular telephone systems.

In addition, due to their configuration, paging systems typically allow for multicasting of paging communications to multiple devices. Thus, a paging system can broadcast information to a large number of users simultaneously. Conversely, cellular telephone systems typically only allow for messages to be transmitted sequentially (i.e., to a single cellular device at a time), and cannot broadcast messages to a specific group of users simultaneously.

The need to subscribe to a paging service (in addition to a cellular service) is important for many users, such as those who work in certain time-sensitive professions. This is mainly due to the higher degree of reliability provided by paging systems. For example medical personnel and emergency workers are often required to carry a paging device in addition to their cellular telephone. In these occupations, receiving messages as reliably and as quickly as possible is extremely important. In hospitals, minutes and even seconds often make the difference between life and death. The ability to deliver messages to doctors and other medical personnel reliably and with as little delay as possible decreases the response time for medical emergencies. This, in turn, decreases the negative impacts to patient health associated with the time taken to respond to the emergency. Likewise, many emergency workers need to receive messages reliably and with the least possible delay in order to respond and react to various emergency situations effectively. Frequently, these emergencies involve life-threatening situations, in which minimal response time is vital. As a result, in these professions, even small increases in the reliability, or decreases in the delay, of message delivery and receipt can significantly increase the number of lives benefitted or saved.

In order to subscribe to both types of services, however, consumers typically have to carry, monitor and maintain two separate devices. This leads to a number of inconveniences with respect to the portability, cost and ease of use of these devices. While systems have been developed that provide an aggregated pager and cellular telephone (e.g., U.S. Pat. No. 5,117,449), these systems have exhibited a number of problems, which has resulted in these devices failing to be adopted by consumers in any meaningful way. One drawback is that, because both paging and cellular phone functionalities are implemented through shared components, only one functionality can utilize these components at a time. Another drawback is that these devices often suffer from increased interference between the incoming paging and cellular signals, due to the extremely close proximity of the paging and cellular receivers.

These aggregated systems also experience significantly decreased battery life, due to the power requirements of implementing both cellular and paging functionalities in a single device. Moreover, these devices do not provide for acknowledgments and status messages to be sent back to the paging network in order to ensure successful delivery and receipt of the paging messages and allow for an audit trail to be recorded. In addition, these aggregated devices require a modification of the physical components of a standard cellular or other wireless device in order to incorporate the paging functionality. As a result, the paging functionality is tied to the specific aggregated device, and users cannot change devices, without either modifying the physical components of the new device or losing the paging functionality.

More recently, systems have been created (e.g., PageCopy by American Messaging; and MessageSync by Indiana Paging) which have attempted to use cellular networks in order to mimic the services offered by paging systems. These systems provide users with an application that can be installed on their cellular telephone or other wireless device that receives and displays certain messages on the device. Importantly, however, these systems do not utilize a paging network and, as such, do not provide true paging services. Instead, these systems merely use the cellular capabilities of the user's device to deliver messages to the device through a cellular network. As a result, these systems do not provide users with the advantages of paging services, such as greater coverage areas, penetration and reliability, and the ability to receive multicasted messages.

Other systems have been developed in which a pager is used to "wake-up," or initiate a call with, a cellular telephone (e.g., U.S. Pat. No. 5,701,337). The purpose of these systems was to conserve the battery life of the cellular device by allowing the cellular device to go into sleep mode or power down and then be "woken-up" by the pager prior to an incoming telephone call. As a result, these systems do not provide users with paging service in addition to cellular telephone service. Accordingly, these systems do not allow users to receive and view paging messages on the user's cellular telephone or wireless device.

Additionally, there has been a significant increase over the last two decades in terrorist attacks and "active shooter" events. A common problem associated with these events is a lack of ability to transmit mass notification messages to individuals in the threat area. Without the ability to broadcast messages, there is no practical way to provide potential victims with status notifications in real-time. Also, these events are often widespread and can involve a large number of emergency or response personnel. As a result, another common problem has been the lack of ability to simultaneously provide status notifications and instructions to update and coordinate such personnel in real time.

Thus, there is a need for a system which combines the features and advantages of electronic devices, paging devices and networks, while maximizing the reliability and minimizing the delay of delivering messages to users. There is also a need for a system which can broadcast emergency messages to a large number of users simultaneously. There is further a need for a universal paging device, which is compatible with, and can communicate paging messages to, various types of electronic devices without modifying any of the physical components of such devices. In light of the beneficial qualities of paging systems, such as greater coverage areas and penetration as well as multicasting, it would be desirable to provide a system which allows users to view paging system messages on wireless devices, such as cellular telephones, and which provides acknowledgements back to the paging system to indicate successful delivery and receipt of the messages.

SUMMARY OF THE INVENTION

One aspect of the invention is to deliver paging messages to users in a manner that maximizes the reliability and minimizes the delay associated with the delivery and receipt of such messages. Another aspect of the invention is to provide a universally compatible, low-cost device, which allow users to receive, view, and respond to such messages while managing and monitoring a single cellular or other wireless device. Yet another aspect of the invention is to provide such a device which does not require modification of the physical components of the device. Yet another aspect of the invention is to provide a system in which emergency messages can be broadcasted to a large group of users at the same time.

The above and other aspects may be realized through systems and methods for communicating messages received through a paging network by a paging device to an electronic device through a connection established between the two devices. In certain embodiments, systems and methods are provided for communicating messages received through a paging network by a paging device to a cellular or other wireless device through a radio connection established between the two devices. The paging device establishes a radio connection with the wireless device. In response to receiving a message from the paging network, the paging device transmits the received message to the wireless device through the established radio connection. In response to receiving the message from the paging device, the wireless device sends an acknowledgment to the paging network that the message was received and displays the message.

In certain embodiments, the paging device can be, or can be incorporated within, a peripheral of a wireless or cellular device, such as a carrying case, holder, or battery extender. In other embodiments, the paging device could be a stand-alone device, such as a key fob. In yet other embodiments, the paging device could be incorporated in other consumer accessories or electronic devices, such as a belt, helmet, television remote, or game controller.

In certain embodiments the paging device can communicate messages received from the paging network to any wireless device capable of receiving and transmitting messages over a cellular network, such as a cellular telephone, smartphone, PDA, or tablet. In accordance with certain of these embodiments, reply messages, receipt, error, read and other acknowledgements and status messages, such as messages indicating the status of the connection between the paging device and the wireless device and the status of the connection between the paging device and the paging network, can be transmitted from the wireless device to the paging network through the cellular network and a network connection between the cellular network and the paging network.

In other embodiments, the paging device can communicate messages received from the paging network to various other electronic devices, such as GPS navigation systems, televisions, gaming consoles, personal computers and laptops, where the message is displayed on the native display associated with the electronic device. In accordance with certain of these embodiments, reply messages, acknowledgements and status messages can be transmitted from the electronic device directly to the paging network through a network connection, such as Wi-Fi, WiMAX, or the Internet or a dedicated network.

In certain embodiments, the wireless or other electronic device, in response to receiving a notification from the paging device that the paging network is unavailable, or detecting that a radio connection cannot be established between the paging device and the wireless device, can notify the paging network accordingly and the paging network can transmit any messages to the wireless device directly through a cellular network or through a network connection between the paging network and the wireless device.

In certain embodiments, one or both of the paging device and the wireless device can generate a number of visual, audible or tactile alerts, including alerts that indicate the receipt of a new message, the status of the connection between the paging device and the wireless device, the availability of the paging network and the battery level of the paging device.

BRIEF DESCRIPTION OF THE DRAWINGS

Further features of the invention, its nature and various advantages will be more apparent from the following detailed description of the preferred embodiments, taken in conjunction with the accompanying drawings, in which like reference characters refer to like parts throughout, and in which.

DETAILED DESCRIPTION OF THE INVENTION

As discussed above, pagers and wireless devices such as cellular telephones have typically been separate devices which operate independently. To reduce the inconvenience of having to manage and monitor two separate devices, one aspect of the invention allows a paging device to communicate with a wireless device such that messages received from the paging network on the paging device can be transmitted to the wireless device for display. Another aspect of the invention allows a paging device to communicate with other electronic devices, such as GPS navigation systems, televisions, laptops, and gaming consoles, wherein messages received from the paging network on the paging device can be transmitted to the electronic device. Yet another aspect of the invention allows for acknowledgements and status messages, as well as reply messages to be transmitted back to the paging network from the wireless device or other electronic device. As used herein, the term "message" means a communication comprising one or more alphanumeric characters intended to be displayed to the recipient. The term "display," as used herein, means a visual, audible, or tactile display or any combination thereof. The systems and methods described below take advantage of the benefits provided by both paging devices and wireless and other electronic devices in order to maximize the level of reliability with respect to the delivery and receipt of paging messages sent to users.

Figure 1:
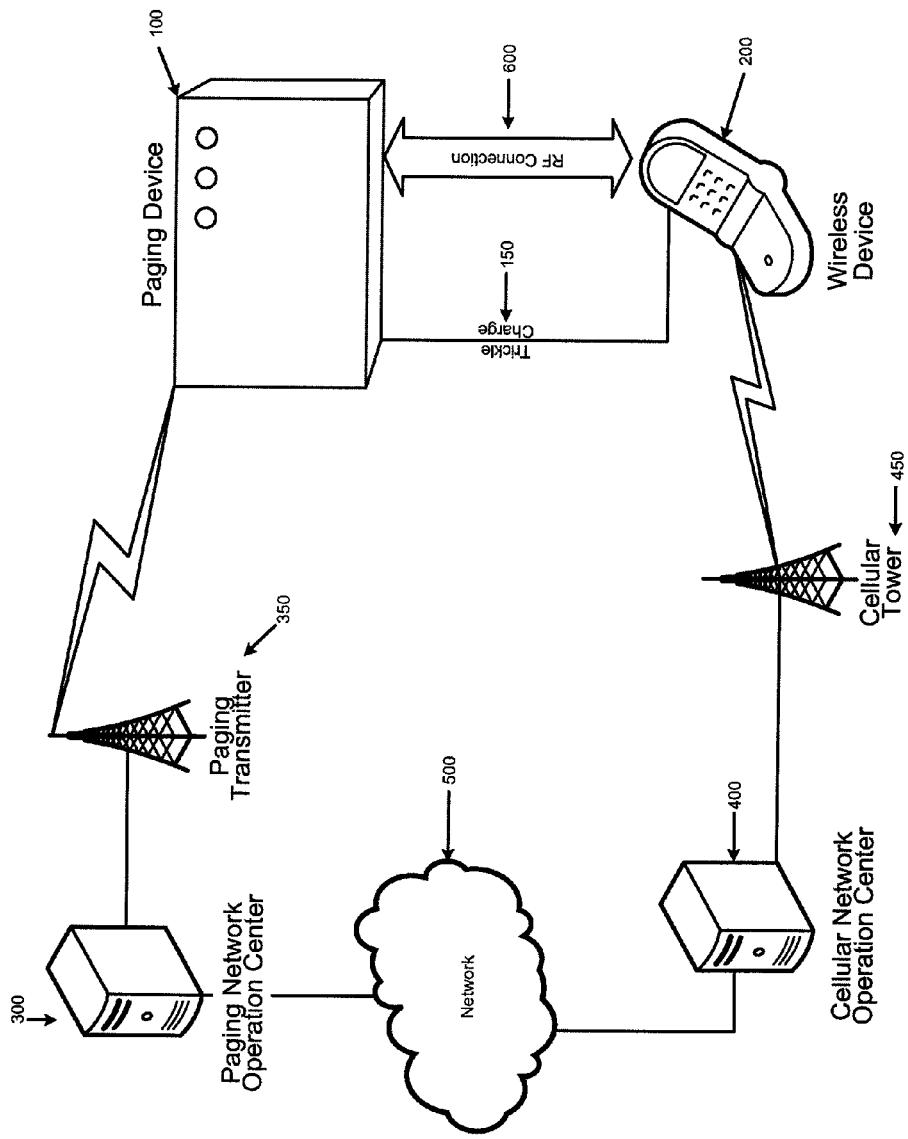
FIG. 1 is a diagram illustrating the interactions between various components, including the wireless and paging devices, according to certain embodiments.

FIG. 1 is a pictorial diagram of a paging and cellular system in accordance with certain embodiments. The system includes Paging Network Operation Center ("NOC") 300 which coordinates and manages the delivery of paging messages. Paging NOC 300 utilizes paging transmitter 350 to transmit messages to paging devices through a standard paging protocol such as FLEX, POCSAG, or any other suitable protocol. Also shown in FIG. 1 is Cellular NOC 400 which coordinates and manages the communications to and from wireless devices. Cellular NOC 400 utilizes cellular tower 450 to transmit and receive call signals and data to and from wireless devices, through a standard cellular protocol such as GSM, CDMA, PHS, or any other suitable protocol. As shown in FIG. 1, Paging NOC 300 and Cellular NOC 400 communicate with each other through network 500. Network 500 could be a local area network, VPN connection, the Internet, or any other suitable connection. It will be appreciated that Paging NOC 300 and Cellular NOC 400 can utilize a plurality of paging transmitters and cellular towers, respectively, although only one of each is shown for illustration purposes. The transmission of paging signals from Paging NOCs to paging devices and the transmission of cellular signals from Cellular NOCs to cellular and other wireless devices is well known in the art.

Also shown in FIG. 1 are examples of a paging device 100 and a wireless device 200. Paging device 100 receives paging messages sent by Paging NOC 300 through paging transmitter 350. Wireless device 200 receives cellular signals from, and transmits cellular signals (e.g., signals sent and received over mobile carrier networks) to, Cellular NOC 400 through cellular tower 450. As shown in FIG. 1, paging device 100 communicates with wireless device 200 through radio frequency RF connection 600, which in this example is a Bluetooth connection. In other embodiments, RF connection 600, could be a ZigBee, Wi-Fi or WiMAX connection, any other short-range radio connection, or any other suitable radio connection. In certain embodiments, paging device 100 sends the messages it receives from Paging NOC 300 to wireless device 200 through RF connection 600. Paging device 100 can also send various attributes associated with the message, including the message status, as well as other information regarding the status of the paging device or paging network to wireless device 200 through RF connection 600.

In certain embodiments, such as is illustrated in FIG. 1, wireless device 200 can be a cellular telephone. In certain of these embodiments, wireless device 200 can communicate with Paging NOC 300 through Cellular NOC 400 and network 500. In other embodiments, wireless device 200 could be any device capable of wireless communication as discussed in the description that follows (e.g., PDA, tablet, computer, laptop, smartphone, GPS device, television, etc.). In certain of these embodiments, wireless device 200 can communicate directly with Paging NOC 300 through network 500 without Cellular NOC 400. In yet other embodiments, wireless device 200 can communicate with Paging NOC 300 through a dedicated network or any other suitable network connection. FIG. 1 also shows a trickle charge 150, through which wireless device 200 may provide power to certain components of, and/or charge the battery in, paging device 100 as described in more detail with respect to FIG. 9 below.

One advantage of the systems and methods described herein, as can be seen in FIG. 1 and its accompanying description, is the ability for users to receive, view and respond to paging messages received from a paging network on a cellular or other wireless device. This allows users to subscribe to paging (as well as cellular) services while only having to monitor and maintain one device. Another advantage is that notifications and acknowledgements can be sent back to the paging network from the wireless device. As a result, the reliability, portability and ease-of-use of the system is increased.

Figure 2:
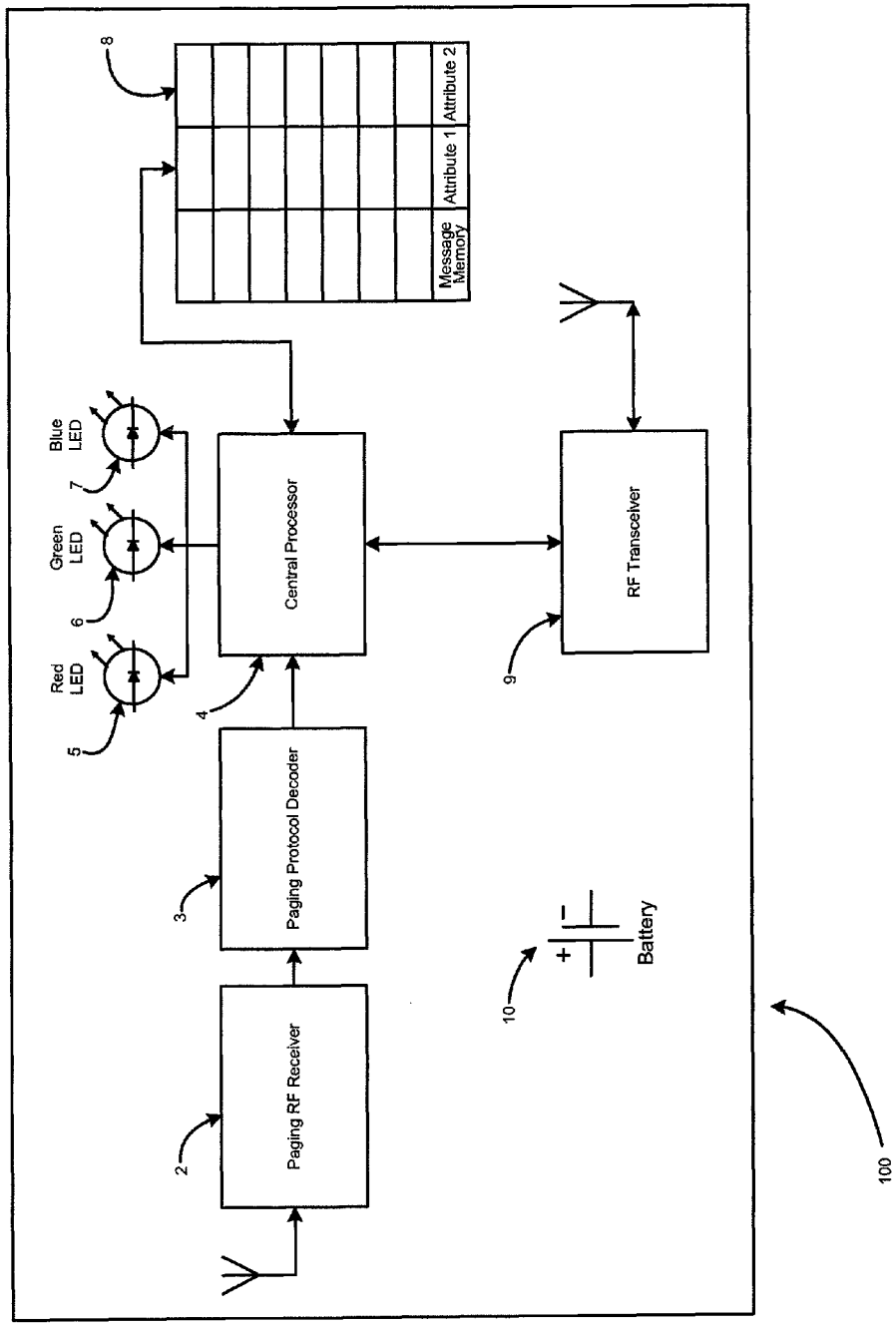
FIG. 2 is a schematic of a portion of the paging device of FIG. 1.

FIG. 2 is a block diagram which illustrates a paging device suitable for use with certain embodiments. Paging device 100 includes a Paging RF Receiver 2 and Paging Protocol Decoder 3, which may be any standard paging receiver components capable of receiving and decoding paging messages over a paging network. Paging RF Receiver 2 receives standard paging signals, such as FLEX or POCSAG Over-The-Air Protocol signals, transmitted from a paging network. Paging Protocol Decoder 3 decodes the signals received by Paging RF Receiver 2 and passes any messages which are addressed to paging device 100 to central processor 4. Central processor 4 may be any standard computer processor or any other suitable type of processor. Although Paging RF Receiver 2, Paging Protocol Decoder 3 and central processor 4 are shown in FIG. 2 as separate components, in certain embodiments two or more of these components may be combined into a single chip. In other embodiments, Paging Protocol Decoder 3 may be specialized firmware or software running on a separate microprocessor or may be software code running on central processor 4.

As shown in FIG. 2, paging device 100 may also include memory 8, which can be utilized by central processor 4 to store messages decoded and passed from Paging Protocol Decoder. In certain embodiments, one or more attributes may be associated with the received messages and stored in memory 8. These attributes may include certain information related to the status of the message, such as whether it was received with errors or whether it has been sent to a wireless device. Also shown in FIG. 2 is a battery 10 which may provide power to active components of paging device 100. Battery 10 may be a standard alkaline battery or a rechargeable battery. While shown in FIG. 2 as an internal battery, battery 10 could also be a user replaceable battery. In certain embodiments, power needed for the operation of certain components of paging device 100 may be alternatively drawn from an external connection capable of receiving power from an AC or DC outlet or an external battery, such as a car battery.

Paging device 100 includes an RF transceiver 9 for communicating with a wireless or other electronic device (such as a PDA, tablet, computer, laptop, smartphone, GPS device, television, etc.). Although RF transceiver 9 is shown in FIG. 2 as separate from Paging RF Receiver 2, RF transceiver 9 and Paging RF Receiver 2 could be combined into a single transceiver, or could be configured to share one or more components of paging device 100. In certain embodiments RF transceiver 9 is a Bluetooth transceiver, however, RF transceiver 9 can be any type of transceiver that utilizes a suitable radio communication protocol, such as Wi-Fi, WiMAX, or ZigBee. RF transceiver 9 is connected to central processor 4 in order to transmit messages received by paging device 100 from a paging network to a wireless device through an radio connection established with the wireless device, as described in more detail in connection with the process depicted in FIG. 4.

As shown in FIG. 2 paging device 100 may also include a message status LED 6, an RF transceiver connection status LED 7 and a power status LED 5 connected to and controlled by central processor 4. In certain embodiments, paging device 100 may incorporate three distinct LEDs. For example, message status LED 6 may be an LED having a first color (e.g., green), which indicates whether the paging device has received messages that have not yet been delivered to the wireless device. Similarly, RF transceiver connection status LED 7 may be an LED having a second color that is different from the first color (e.g., blue), which indicates whether there is an active RF connection between paging device 100 and the wireless device. Also, power status LED 5 may be an LED having a third color that is different from the first and second colors (e.g., red), which indicates if the power level of battery 10 is below a certain threshold. In other embodiments, one or more of message status LED 6, RF transceiver connection status LED 7 and power status LED 5 could be removed, or replaced by, other types of visual, auditory, or tactile alert mechanisms.

According to certain embodiments, paging device 100 may be, or may be incorporated with, an accessory or peripheral for the wireless device, e.g., embedded in a carrying case or battery extender, as described in more detail in connection with the embodiments depicted in FIG. 9. In other embodiments paging device 100 may be incorporated with other accessories or consumer electronic devices, such as a helmet, belt, television remote, or game controller, as described in more detail in connection with the embodiments depicted in FIGS. 9 and 11-12. In yet other embodiments, paging device 100 may further be a stand-alone device or small apparatus, such as a key fob, which can be carried by an individual or may be mounted in an automobile as described in more detail in connection with the embodiments depicted in FIG. 10.

Figure 3:
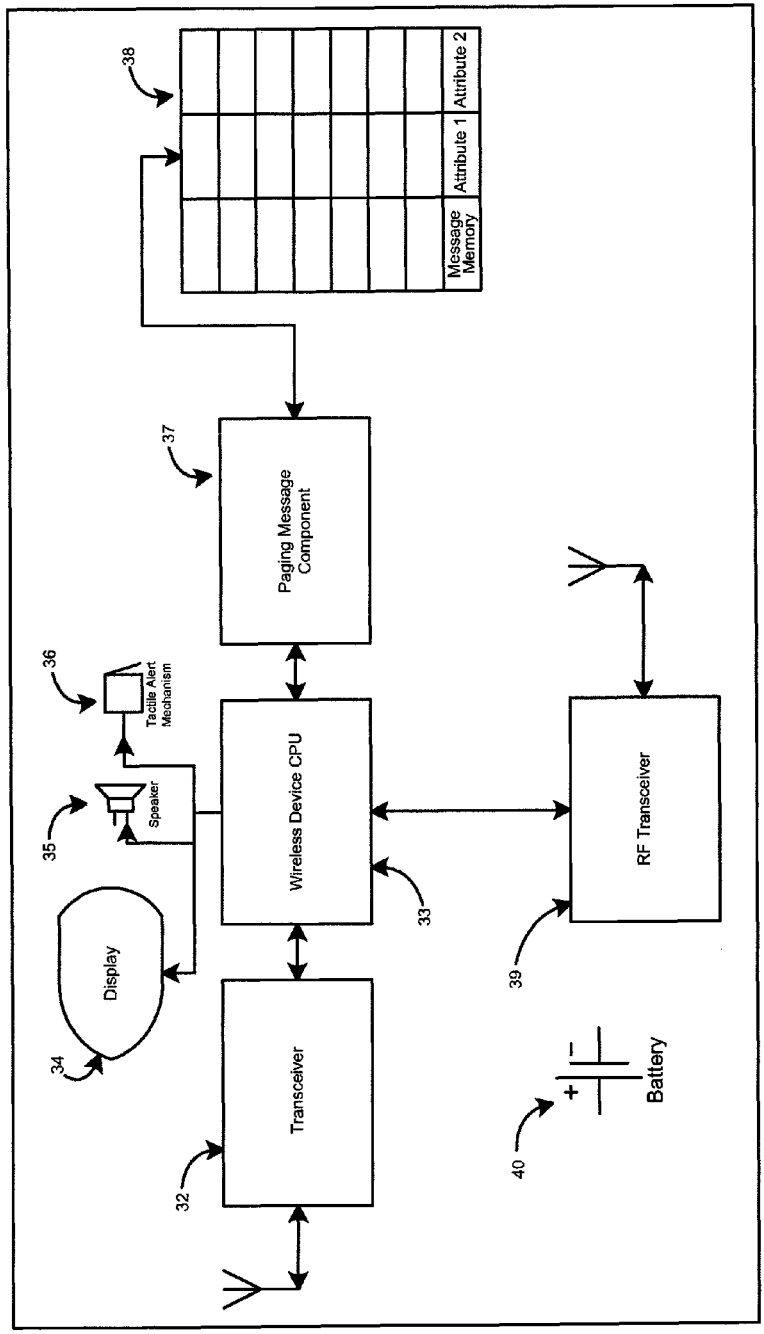
FIG. 3 is a schematic of a portion of the wireless device of FIG. 1.

FIG. 3 is a block diagram which illustrates a wireless device suitable for use with certain embodiments. As shown in FIG. 3, wireless device 200 includes transceiver 32, which, in certain embodiments where wireless device 200 is a cellular device, may be any standard cellular transceiver. Transceiver 32 passes voice and/or data signals to, and receives voice and/or data signals from, wireless device CPU 33. In certain embodiments, transceiver 32 may also be used to transmit acknowledgements and status notifications back to the paging network through the cellular network. The cellular network can then pass these acknowledgements and status notifications to the paging network through any suitable network connection between the cellular and paging networks, such as the Internet. In other embodiments, wireless device 200 may transmit these acknowledgements and status notifications to the paging network through a network connection between the wireless device and the paging network.

In accordance with certain of these embodiments, the wireless device may transmit acknowledgements indicating that a message has been received, that a message has been received with errors, and that a message has been read. The wireless device may also transmit notifications that indicate whether or not the wireless device has an active RF connection with the paging device and whether the paging network is available at the paging device. In addition, the wireless device may transmit reply messages when a user wishes to respond to a message received at the wireless device. This functionality allows for bidirectional communication with the paging network, which provides a number of benefits. For example, one benefit is that the paging network can record a full audit trail of the delivery, receipt, read, and status of the messages, including any errors in the process. Another benefit is that the system can better ensure that messages are received and read by users. For example, if the paging network does not receive an acknowledgement that a message has been received or read within a certain amount of time, the paging network can transmit the message to the paging device again and could also transmit the message directly to the wireless device, either through the cellular network or a direct network connection. This functionality increases the reliability of the system as a whole.

As shown in FIG. 3, wireless device 200 also includes RF transceiver 39 for communicating with a paging device.

Although RF transceiver 39 is shown in FIG. 3 as separate from transceiver 32, the transceivers could be combined into a single transceiver, or be configured to share one or more components of wireless device 200. In certain embodiments RF transceiver 39 is a Bluetooth transceiver, however, RF transceiver 39 can be any type of transceiver that utilizes a suitable radio communication protocol, such as Wi-Fi, WiMAX, or ZigBee. RF transceiver 39 is connected to wireless device CPU 33 and passes any messages or signals it receives from the paging device to wireless device CPU 33.

Wireless device 200 also includes a Paging Message Component 37, which is connected to wireless device CPU 33. Wireless device CPU 33 passes any messages or signals it receives from RF transceiver 39 to Paging Message Component 37. In certain embodiments, the function associated with Paging Message Component 37, may be implemented in software running on wireless device CPU 33, such as a mobile device application, thereby removing any need for modifying the physical components of a standard wireless device such as a smartphone. In other embodiments, the function associated with Paging Message Component 37 may be integrated in the operating system running on wireless device CPU 33. Alternatively, Paging Message Component 37 may be a specialized chip, such as a microprocessor, which includes program instructions in firmware. Also shown in FIG. 3 is a memory 38, which may be controlled by Paging Message Component 37. In certain embodiments, Paging Message Component 37 may utilize memory 38 to store messages, as well as other message attributes and status notifications received from the paging device through RF transceiver 39.

In certain embodiments, Paging Message Component 37 may be integrated with, or utilize, certain functions included in wireless device 200 to provide additional benefits to users of such devices. For example, Paging Message Component may integrate with an address book or a contact list in wireless device 200. This can provide numerous benefits, such as the ability to save telephone numbers or other contact information included in any messages received from paging device 100, look up information associated with the sender of such messages, or link or connect such messages to a corresponding contact entry. Also, in the event that the recipient of a message is unable to respond as requested in the message, the recipient could respond with the contact information of an alternate individual who may be able to respond. Paging Message Component 37 may also integrate with the e-mail or text messaging capabilities of wireless device 200. This can allow for additional functionalities, such as the ability to forward messages received from the paging device to other individuals or groups or respond to the sender or the paging network through e-mail or text messages.

As another example, Paging Message Component 37 may utilize a calendar feature of wireless device 200. In this example, messages including appointments or meetings may be received at wireless device 200 from paging device 100 and be automatically integrated into the calendar on wireless device 200. In other embodiments, links to Internet websites may be included in the messages received at wireless device 200. These links could then be accessed through the web browsing capabilities of wireless device 200.

As shown in FIG. 3, wireless device 200 may include a display 34, a speaker 35, and a tactile alert mechanism 36, all of which may be connected to, and operated by, wireless device CPU 33. In certain embodiments, in response to receiving messages or signals from a paging device, Paging Message Component 37 may instruct wireless device CPU 33 to display the message on display 34. According to certain of these embodiments, the message may be displayed in any suitable manner that is consistent with standard procedures used by wireless device 200. For example, the display of the message may interrupt the wireless device's normal display procedures and require certain action by the user of wireless device 200, before any other processing may occur on wireless device 200. Paging Message Component 37 may also instruct wireless device CPU to generate an audible or tactile alert by utilizing speaker 35 or tactile alert mechanism 36. For example, the message could be converted into an audible message, which may be output through speaker 35. In certain other embodiments, one or more of display 34, speaker 35, or tactile alert mechanism 36 could be removed, or replaced by, other types of visual, auditory, or tactile alert mechanisms.

According to certain embodiments, wireless device 200 can be any device that is capable of receiving and transmitting cellular signals over a cellular network, such as cellular telephones, smartphones, PDAs, and tablets. Wireless device 200 may also be any electronic device that is capable of communicating over other types of networks, such as WiMAX, the Internet, or other suitable networks. For example, wireless device 200 may be an Internet television, gaming console, personal computer, or laptop, as described in more detail in connection with the embodiments depicted in FIGS. 11-12. In certain embodiments, wireless device 200 may be other types of electronic devices, such as a GPS navigation system, as described in more detail in connection with the embodiments depicted in FIG. 10.

As can be seen from FIGS. 1-3 and their accompanying descriptions, the systems and methods described herein allow users to receive, view, and respond to messages received from a paging network on a wide range of wireless and other electronic devices, without the need to modify the physical components of such devices. Accordingly, one advantage, is that individuals can receive the benefits associated with paging services, while using their current, unmodified, cellular, wireless, and other electronic devices, and can seamlessly transition to using new devices without losing these benefits.

Figure 4:
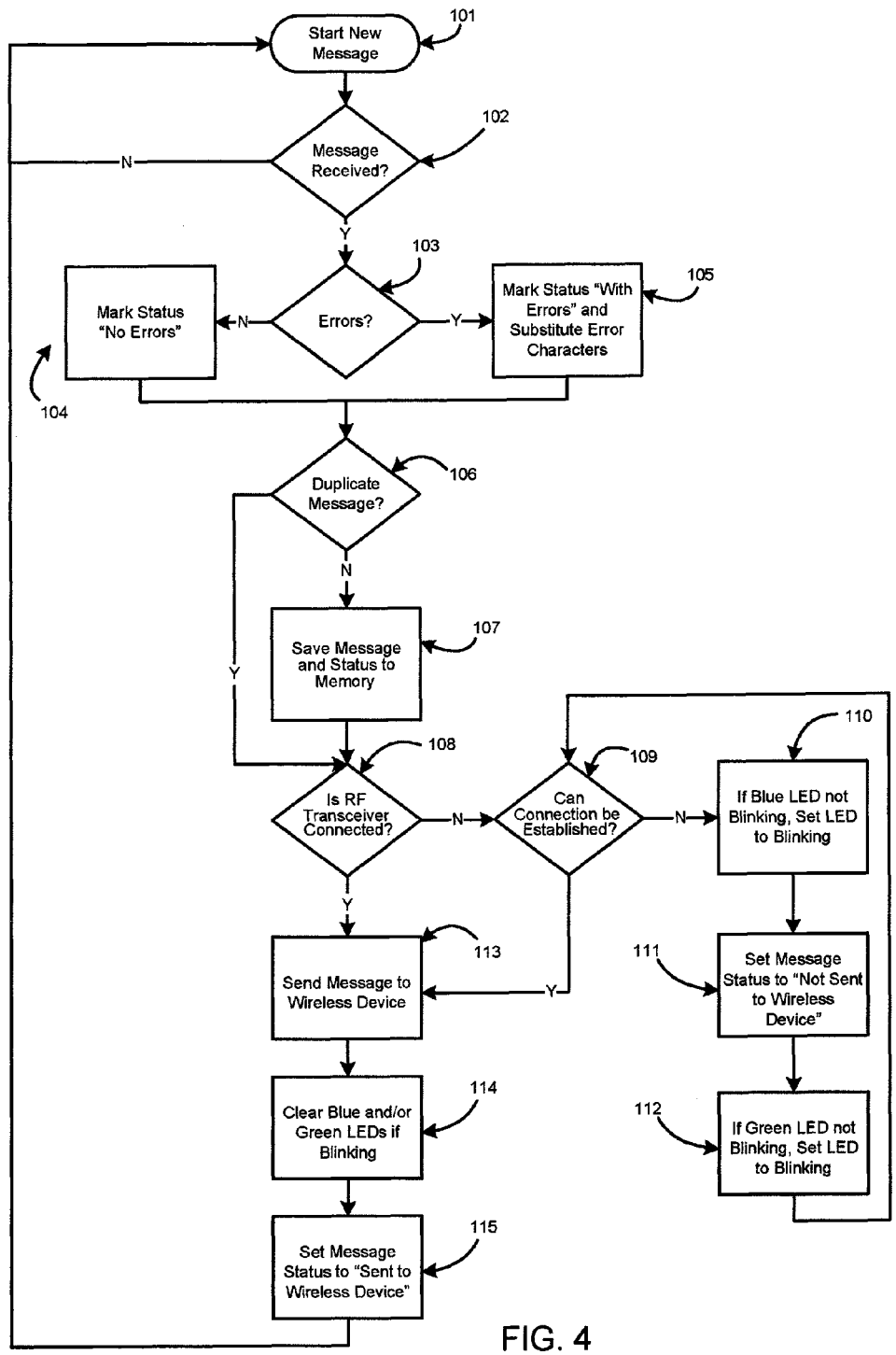
FIG. 4 is a flow diagram of a process that may be used by the paging device in accordance with certain embodiments.

FIG. 4 is a flowchart illustrating the operation of the paging device described in FIGS. 1 and 2 in accordance with certain embodiments. At step 101, Paging RF Receiver 2 of paging device 100 scans the appropriate paging frequency for any new transmissions from the paging network. At step 102, in response to detecting the address of paging device 100 in the transmission, the Paging RF Receiver 2 captures the transmission and passes the associated data to the Paging Protocol Decoder 3 for decoding. Paging Protocol Decoder 3 decodes the received data into a message based upon the appropriate standard paging protocol, (e.g., FLEX, POCSAG, etc.). At step 103, Paging Protocol Decoder 3 checks to see if the decoded message has any errors. If errors are detected, flow proceeds to step 105 and Paging Protocol Decoder 3 attempts to correct any errors that are correctable (e.g., by using any standard error detection and correction mechanisms, such as using a checksum or other similar algorithm to correct any errors or replacing missing characters with error characters) and marks the status of the message appropriately, such as "With Errors." If no errors are detected, flow proceeds to step 104 and Paging Protocol Decoder 3 marks the status of the message appropriately, such as "Error Free." Flow then proceeds to step 106.

At step 106, Paging Protocol Decoder 3 passes the message to central processor 4, which compares the received message with any previously stored messages to determine if it is a duplicate message. In certain embodiments, central processor 4 may compare one or more attributes associated with the received message to one or more attributes associated with the stored messages to determine whether the received message is a duplicate message. If the received message is determined to be a duplicate message, flow proceeds to step 108. Otherwise, if the received message is determined not to be a duplicate message, central processor 4 stores the message in memory 8 at step 107. In certain embodiments, central processor 4 may also store additional attributes associated with the received message, such as a timestamp, delivery status, or error status in memory 8.

At step 108, central processor 4 checks whether there is an active RF connection established with wireless device 200. In certain embodiments paging device 100 may establish an RF connection with wireless device 200 prior to receiving any messages (e.g., when the paging device powers up). In other embodiments, paging device 100 may establish an RF connection with wireless device after receiving one or more messages (e.g., because the connection could not be established previously, or in order to conserve battery power). If an active RF connection is detected, flow proceeds to step 113.

Otherwise, flow proceeds to step 109, at which time central processor 4 attempts to establish an RF connection with wireless device 200 through RF transceiver 9. If an RF connection can be established, flow proceeds to step 113. Otherwise, if an RF connection cannot be established, at step 110, central processor 4 checks whether RF transceiver connection status LED 7 is blinking and, if not, sets RF transceiver connection status LED 7 to a blinking state in order to indicate that paging device 100 is not able to establish a RF connection with wireless device 200. At step 111, central processor 4 marks the status of the received message appropriately, such as "Not Sent to Wireless Device" and stores the message status in memory 8. At step 112, central processor 4 checks whether message status LED 6 is set to a blinking state and, if not, sets message status LED 6 to a blinking state to indicate that paging device 100 has received one or more messages that have not yet been transmitted to wireless device 200. Flow then returns to step 109 where central processor 4 continues to check whether an RF connection can be established with the wireless device.

When an RF connection is established between paging device 100 and wireless device 200, at step 113 central processor 4 sends the received message, as well as any messages in memory 8 that have a status of "Not Sent to Wireless Device," to wireless device 200 through the established RF connection. At step 114, central processor 4 checks whether either of the message status LED 6 or RF transceiver connection status LED 7 are set to a blinking state and, if so, sets the LEDs to a non-blinking state. Central processor 4 then sets the message status of any messages sent to wireless device 200 appropriately, such as "Sent to Wireless Device," at step 115 and stores the message statuses in memory 8. The flow then returns to step 101 in order for Paging RF Receiver 2 to continue scanning the paging frequency for any new messages from the paging network.

Figure 5:
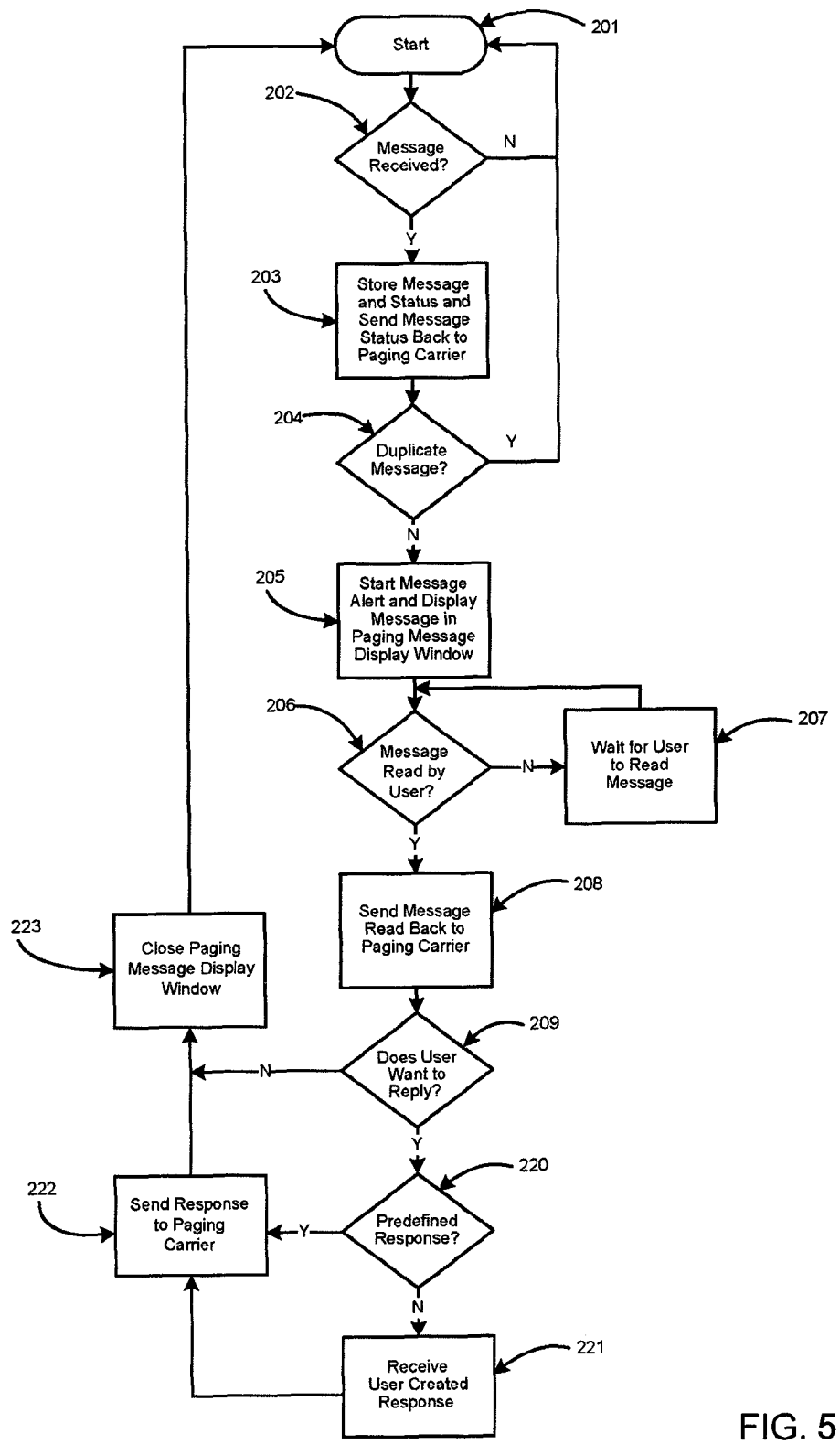
FIG. 5 is a flow diagram of a process that may be used by the wireless device in accordance with certain embodiments.

FIG. 5 is a flowchart illustrating the operation of the wireless device described in FIGS. 1 and 3 in accordance with certain embodiments. At step 201, wireless device 200 waits for a message to be received from paging device 100 through RF transceiver 39. When a message is received, at step 202 RF transceiver 39 passes the message (along with any attributes or statuses associated with the message) to wireless device CPU 33, which, in turn, passes the message to Paging Message Component 37. In other embodiments, such as where Paging Message Component 37 is a separate specialized chip or microprocessor, RF transceiver 39 may pass the message directly to Paging Message Component 37.

At step 203, Paging Message Component 37 stores the message, as well as any associated message attributes or statuses, in memory 38. In certain embodiments, Paging Message Component 37 may also instruct wireless device CPU 33 to transmit a "message received" acknowledgement, which may also include one or more the message attributes, such as the message error status, through transceiver 32 to the paging network. In certain embodiments, the paging network, in response to receiving an acknowledgement that indicates a message was received with errors, may retransmit the message to the paging device. Although in this example, e.g., where the wireless device is a cellular device, the acknowledgement is transmitted to the paging network through the cellular network and the network connection between the cellular and paging networks, in other embodiments, e.g., where the wireless device is another type of electronic device, the wireless device may transmit the acknowledgement to the paging network through a direct network connection, such as a Wi-Fi, WiMAX, or hardwire Internet connection with the paging network.

At step 204, Paging Message Component 37 checks whether the received message is a duplicate of one or more messages previously stored in memory 38. In certain embodiments, Paging Message Component 37 may also compare one or more attributes associated with the received message to one or more attributes associated with the stored messages to determine whether the received message is a duplicate message. If Paging Message Component 37 detects that the received message is a duplicate message, flow returns to step 201 in order for wireless device 200 to wait for any new messages to be received from paging device 100. Otherwise flow proceeds to step 205, at which time Paging Message Component 37 instructs wireless device CPU 33 to display the message on display 34.

In certain embodiments, Paging Message Component 37 may also instruct wireless device CPU 33 to generate one or more audible or tactile alerts using speaker 35 or tactile alert mechanism 36, such as to alert the user of wireless device 200 when a message is received. One or more of these alerts may be managed according to certain preferences chosen by the user of wireless device 200. According to certain of these embodiments, the display of the received message or the alerts may be handled consistent with standard procedures used by wireless devices, such as are used in connection with SMS text messaging. In other embodiments, one or more of the display or alerts may be handled as a priority thread by the wireless device, which may interrupt the wireless device's normal display procedures and supersede any other processing of the wireless device.

At step 206, Paging Message Component 37 detects whether the displayed message has been acknowledged or read by the user of wireless device 200 (e.g., by the user pressing a button on, or the screen of the wireless device) and, if not, flow proceeds to step 207, where Paging Message Component 37 waits for the user to acknowledge the message. Once the user has acknowledged the message, flow proceeds to step 208. At step 208, Paging Message Component 37 directs wireless device CPU 33 to transmit a "message read" acknowledgement to the paging network through transceiver 32. The message read acknowledgement may be transmitted to the paging network in a similar manner to that described in connection with step 203 above.

At step 209 Paging Message Component 37 queries the user to determine whether the user wants to reply to the received message. If not, the flow proceeds to step 213. Otherwise, flow proceeds to step 210, at which time Paging Message Component 37 instructs wireless device CPU 33 to present the user with the option of choosing a predefined response or providing a custom reply. If the user chooses a predefined response, the flow proceeds to step 112. Otherwise, the flow proceeds to step 111, and Paging Message Component 37 receives the custom response from the user (e.g., through a standard user interface provided by wireless device 200). At step 112, Paging Message Component 37 directs wireless device CPU 33 to transmit the predefined or custom reply to the paging network through transceiver 32. The reply may be transmitted to the paging network in a similar manner to that described in connection with step 203 above. At step 213, Paging Message Component 37 instructs wireless device CPU 33 to remove the message from the display (e.g., by closing the message display window), disable any alerts associated with the received message, and flow returns to step 201 in order for wireless device 200 to wait for any new messages from paging device 100.

In certain embodiments, the systems and methods described above can be used to multicast messages to groups of users. For example, paging NOC 300 can create and transmit a message, which is addressed to more than one paging device. Each paging device to which the message is addressed could then receive the message and send it to a wireless or other electronic device through an established radio connection in the same manner as is described above in connection with FIGS. 4-5. As a result, one advantage is that messages, such as emergency notifications or instructions, can be broadcast to specified groups of individuals simultaneously, which could minimize the delay associated with the receipt of, and response to, such messages.

Figure 6:
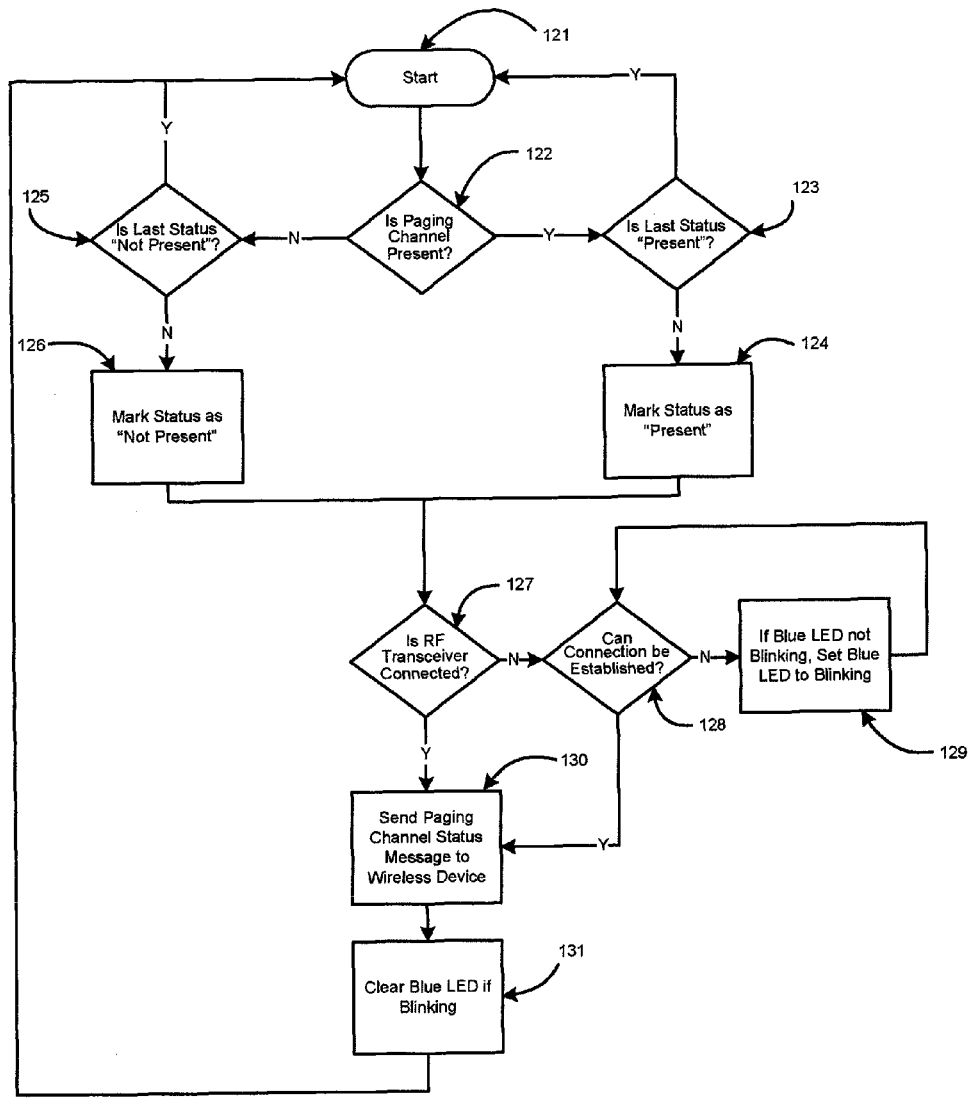
FIG. 6 is a flow diagram of another process that may be used by the paging device in accordance with certain embodiments.

FIG. 6 is a flowchart further illustrating the operation of the paging device described in FIGS. 1 and 2 in accordance with certain embodiments. Paging device 100 can monitor the status of its connection to the paging network (i.e., ability to receive paging messages from the paging network) and communicate this status to wireless device 200 through an established RF connection with the wireless device. The status can also be communicated to the paging network, which in certain embodiments, can then send messages to wireless device 200 through a cellular or other suitable network. This increases the reliability with respect to the delivery and receipt of messages by allowing for alternate message delivery mechanisms in circumstances where paging device 100 is not connected to the paging network.

As shown in FIG. 6, at step 121, Paging RF Receiver 2 scans the appropriate paging frequency and, at step 122, it detects whether the paging channel is present (i.e., whether the paging network is available). If the paging channel is present, the flow proceeds to step 123, otherwise the flow proceeds to step 125. At step 123, central processor 4 checks whether a paging channel status is marked as "Present." In certain embodiments, the paging channel status may be stored in the memory of paging device 100. If the paging channel status is marked as "Present," the flow returns to step 121 and paging device 100 continues to monitor the status of the paging channel. Otherwise, flow proceeds to step 124 at which point central processor 4 marks the paging channel status as "Present," and flow proceeds to step 127. At step 125, central processor 4 checks whether the paging channel status is marked as "Not Present." If the paging channel status is marked as "Not Present," the flow returns to step 121 and paging device 100 continues to monitor the status of the paging channel. Otherwise, flow proceeds to step 126 and central processor 4 marks the paging channel status as "Not Present." Flow then proceeds to step 127.

At step 127, central processor 4 detects whether there is an active RF connection with wireless device 200. If there is an active connection the flow proceeds to step 130. Otherwise, the flow proceeds to step 128, and central processor 4 attempts to establish an RF connection with the wireless device 200 through RF transceiver 9. If an RF connection is successfully established, the flow proceeds to step 130. Otherwise, if an RF connection cannot be established with wireless device 200, flow proceeds to step 129 at which time central processor 4 checks whether RF transceiver connection status LED 7 is set to a blinking state and, if not, sets it to a blinking state. Flow then returns to step 128 and paging device 100 continues to attempt to establish an RF connection with the wireless device 200 through RF transceiver 9.

Once an RF connection is established with wireless device 200, at step 130 central processor 4 transmits the paging channel status to wireless device 200 through the established RF connection. Central processor 4 then checks whether RF transceiver connection status LED 7 is set to a blinking state at step 131 and, if so, sets it to a not blinking state. Flow then returns to step 121 in order for paging device 100 to continue monitoring the status of the paging channel.

Figure 7:
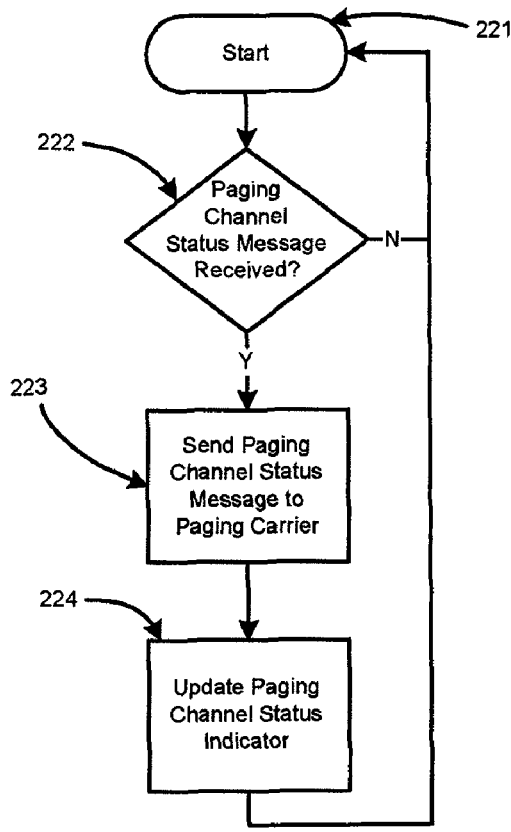
FIG. 7 is a flow diagram of another process that may be used by the wireless device in accordance with certain embodiments.

FIG. 7 is a flowchart illustrating the operation of the wireless device described in FIGS. 1 and 3 in accordance with certain embodiments. Wireless device 200 can receive notifications of the status of the availability of the paging network from paging device 100 and can transmit this status notification to the paging network. As discussed above, in certain embodiments, this allows the paging network to utilize alternate mechanisms to deliver messages to wireless device 200, which increases the overall reliability of the system.

At step 221, wireless device 200 waits for the receipt of a paging channel status from paging device 100 through RF transceiver 39. When a paging channel status is received at step 222, RF transceiver 39 passes the paging channel status to Paging Message Component 37 through wireless device CPU 33. At step 223, Paging Message Component 37 directs wireless device CPU 33 to transmit the paging channel status to the paging network. The paging channel status may be transmitted to the paging network in a similar manner to that described in connection with FIG. 5 above. At step 224, Paging Message Component 37 directs wireless device CPU 33 to update the paging channel status indicator on display 34 of wireless device 200. Flow then returns to step 221 in order for wireless device 200 to wait for any additional paging channel statuses to be received from paging device 100.

Figure 8:
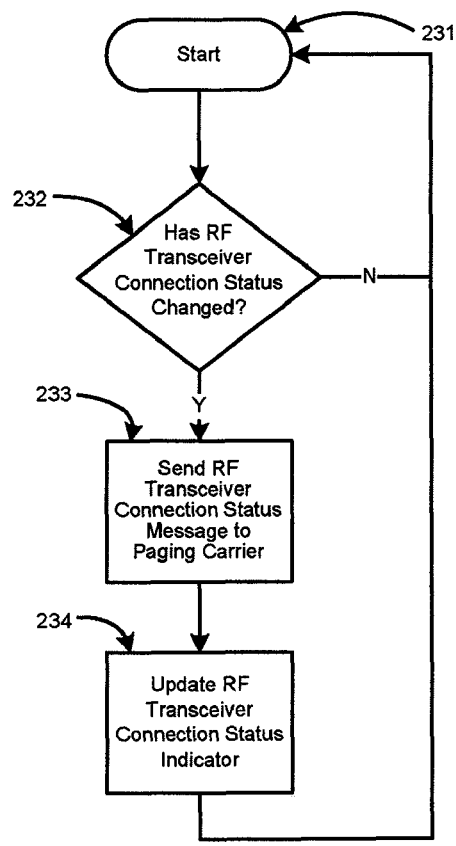
FIG. 8 is a flow diagram of yet another process that may be used by the wireless device in accordance with certain embodiments.

FIG. 8 is a flowchart illustrating the operation of the wireless device described in FIGS. 1 and 3 in accordance with certain embodiments. Wireless device 200 can detect the status of the RF connection between wireless device 200 and paging device 100 and can transmit a notification of the RF connection status to the paging network. In certain embodiments, the paging network can then send messages to wireless device 200 through a cellular or other suitable network. This allows for alternate message delivery mechanisms to be utilized in certain circumstances where wireless device 200 cannot establish a connection to paging device 100, thereby increasing the reliability of the system.

At step 231, Paging Message Component 37 monitors the status of the RF connection with paging device 100 through RF transceiver 39. RF transceiver 39 passes the status of the RF connection with paging device 100 to Paging Message Component 37 at step 232, and Paging Message Component 37 determines whether there has been any change in the status of the RF connection. In certain embodiments, Paging Message Component 37 compares the current status of the RF connection with an RF connection status previously stored in memory to determine whether there has been a change in the status of the RF connection. If there has not been a change in status, the flow returns to step 231. Otherwise, flow proceeds to step 233, at which time Paging Message Component 37 transmits the RF connection status to the paging network. The RF connection status may be transmitted to the paging network in a similar manner to that described in connection with FIG. 5 above. At step 234, Paging Message Component 37 directs wireless device CPU 33 to update the RF connection status indicator on display 34 of wireless device 200. Flow then returns to step 231 in order for wireless device 200 to continue to monitor the status of the RF connection with paging device 100.

In accordance with the embodiments described in connection with FIGS. 6-8, wireless device 200 can notify and update the paging network as to the status of the RF connection between wireless device 200 and paging device 100, and/or the ability of paging device 100 to connect to the paging network. In certain embodiments, i.e., where wireless device includes cellular capability, these notifications can be transmitted to the cellular network through cellular transmissions and, in turn, can be passed on to the paging network through a connection between the cellular network and the paging network. In other embodiments, these notifications can be transmitted from wireless device 200 to the paging network directly, such as through a Wi-Fi, WiMAX or Internet network connection between wireless device 200 and the paging network or any other suitable network connection.

In certain embodiments the paging network, in response to receiving a notification that either the RF connection cannot be established or the paging network is unavailable on paging device 100, can direct the cellular network to transmit any messages intended for paging device 100, directly to wireless device 200 through the cellular network, or can communicate such messages to wireless device 200 through a direct network connection with the wireless device. The direct transmission of messages to wireless device 200 may replace, or may be in addition to, the transmission of such messages to paging device 100 by the paging network. In accordance with certain of these embodiments, the paging network may cease, or may direct the cellular network to cease, the direct transmission of messages to wireless device 200, in response to receiving a notification that either or both of the RF connection being established or the paging network being available on paging device 100.

Accordingly, successful delivery and receipt of messages is maximized, and any associated delay is minimized, by providing alternate message delivery mechanisms in certain situations, such as where paging messages cannot be received by the paging device or cannot be communicated from the paging device to the wireless device. This provides redundancy and, therefore, results in an overall increase to the reliability of the messaging system.

Figure 9:
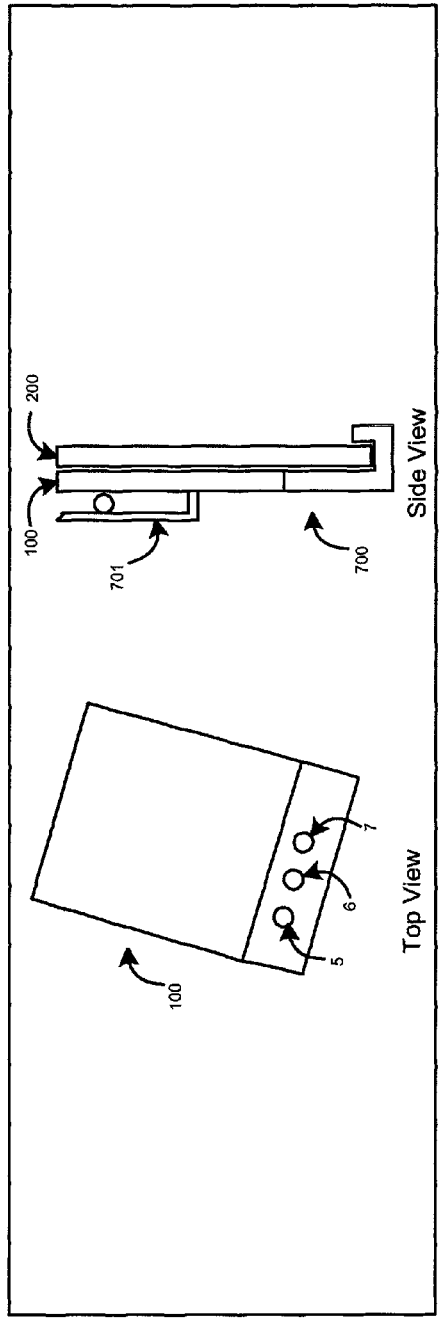
FIG. 9 is a diagram illustrating the paging device according to certain embodiments.

FIG. 9 is a pictorial diagram of the paging device in accordance with certain embodiments. As shown in FIG. 9, paging device 100 is incorporated in a carrying case 700. Paging device 100 may include the same components as described and illustrated in connection with FIG. 2. Carrying case 700 can be a sleeve, cover, holder or any other suitable case for a wireless or other electronic device, such as wireless device 200 with which paging device 100 communicates through a radio connection. Paging device 100 may be incorporated within carrying case 700, as illustrated in FIG. 9. In other embodiments, paging device 100 can be affixed to or removably attached to carrying case 700. As shown in FIG. 9, carrying case 700 may include a belt clip 701, which can be used to attach carrying case 700 to a belt or other suitable consumer accessory.

Although in FIG. 9 paging device 100 is shown as being incorporated in carrying case 700, paging device 100 could also be incorporated in any peripheral or accessory for a cellular or other wireless device, such as a battery extender. In other embodiments, paging device 100 may be incorporated in other accessories, such as a helmet or belt. In yet other embodiments paging device 100 may be a stand-alone device, such as a key fob, which could be carried or worn by a user. In certain of these embodiments, paging device 100 and wireless device 200 may operate in a similar manner as described and illustrated in connection with FIGS. 2-8 above.

As shown in FIG. 9, carrying case 700 is capable of receiving wireless device 200. In certain embodiments, such as where wireless device 200 is held by, or attached to, carrying case 700, wireless device 200 and paging device 100 may communicate through a wired connection, which may be included in carrying case 700. Paging device 100 may send messages and other notifications to wireless device 200 through the wired connection. In certain of these embodiments, one or more of message status LED 6, an RF transceiver connection status LED 7 and a power status LED 5, as well as any other alerts generated by paging device 100, could be temporarily disabled. Wireless device 200 may also provide power to paging device 100, such as through a trickle charge from wireless device 200 to paging device 100. In certain embodiments, the trickle charge may be used to provide power to certain components of paging device 100 and/or to recharge the battery in paging device 100.

Figure 10:
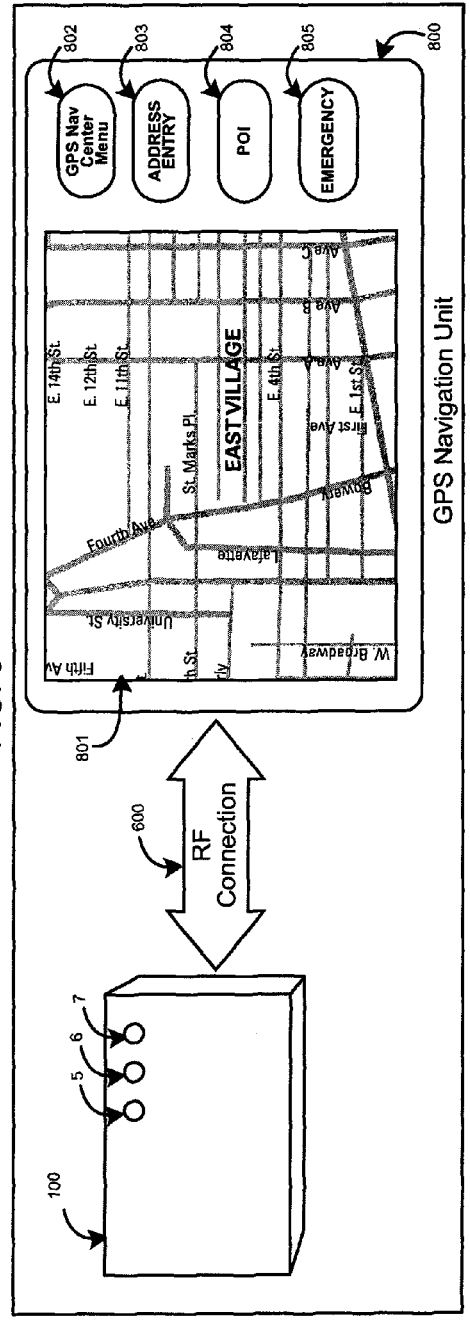
FIG. 10 is a diagram illustrating the interactions between various components, including the paging device and a GPS device according to certain other embodiments.

FIG. 10 is a pictorial diagram illustrating the interactions between various components of the system, including the paging device and a GPS device according to certain embodiments. The system illustrated in FIG. 10 may include many of the components illustrated and described in connection with FIG. 1, such as the Paging NOC 300, paging transmitter 350, and paging device 100. Paging device 100 may include the same components as illustrated and described in connection with FIG. 2.

Also shown in FIG. 10 is a GPS navigation system 800. GPS navigation system 800 may be a vehicle navigation system that is incorporated in the vehicle or a stand alone navigation system in the vehicle, or it may be any other suitable type of navigation system. In certain embodiments, GPS navigation system 800 communicates with a dedicated GPS network via satellite. As shown in FIG. 10, GPS navigation system 800 includes a display 801, which may be used to display certain information to users of the navigation system. GPS navigation system 800 may also include or connect to other visual or audible components, which may be used to provide certain information or alerts to users. GPS navigation system 800 may also receive input from users through any suitable user interface, such as buttons 802-805 as shown in FIG. 10. In certain embodiments, GPS navigation system 800 may include a transceiver which may be used to communicate with the paging network through any suitable radio network. In other embodiments, GPS navigation system 800 may communicate with the paging network through a dedicated network, such as a satellite communications network.

Although paging device 100 is illustrated in FIG. 10 as a separate device, paging device 100 may also be incorporated in, or attached to, GPS navigation system 800. Paging device 100 may operate in a similar manner as described and illustrated in connection with FIG. 3. As shown in FIG. 10, paging device 100 may transmit any messages it receives, along with any message attributes and status notifications to GPS navigation system 800 through an RF connection 600, which can be established between paging device 100 and GPS navigation system 800. RF connection 600 can operate in a similar manner as illustrated and described in connection with FIG.

1. Alternatively, RF connection 600 could be a wired connection between paging device 100 and GPS navigation system 800.

In certain embodiments, in response to receiving a message from paging device 100, GPS navigation system 800 may store the message (as well as any message attributes and statuses) in memory and display the message on display 801. GPS navigation system may also generate one or more visual or audible alerts in order to indicate the receipt of the message. For example, in certain embodiments, GPS navigation system 800 may announce the receipt of the message and/or output an audible representation of the message through a connected speaker.

According to certain embodiments, the paging network can send real-time traffic updates and other conditions to paging device 100, which can then be transferred to GPS navigation system 800. GPS navigation system 800 may then display this information on display 801 and/or use this information in determining travel routes. GPS navigation system 800 may also send data to the paging network related to its current position in the same manner as discussed above. In certain embodiments the paging network may send location based messages to paging device 100, such as travel related discounts, coupons and advertisements.

Figure 11:
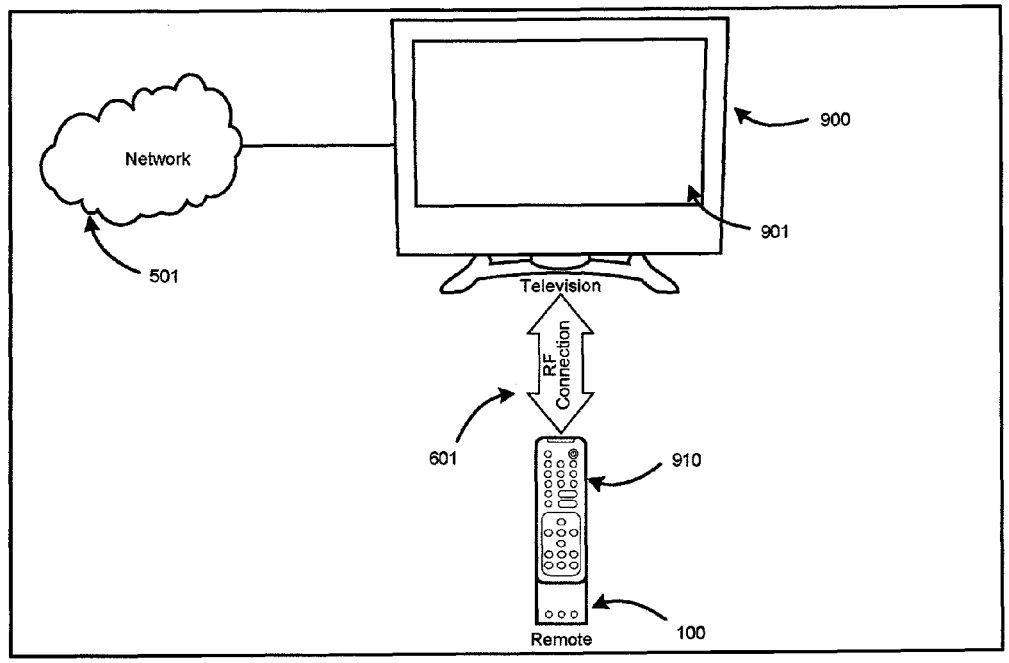
FIG. 11 is a diagram illustrating the interactions between various components, including the paging device and a Television according to yet other embodiments.
Figure 12:
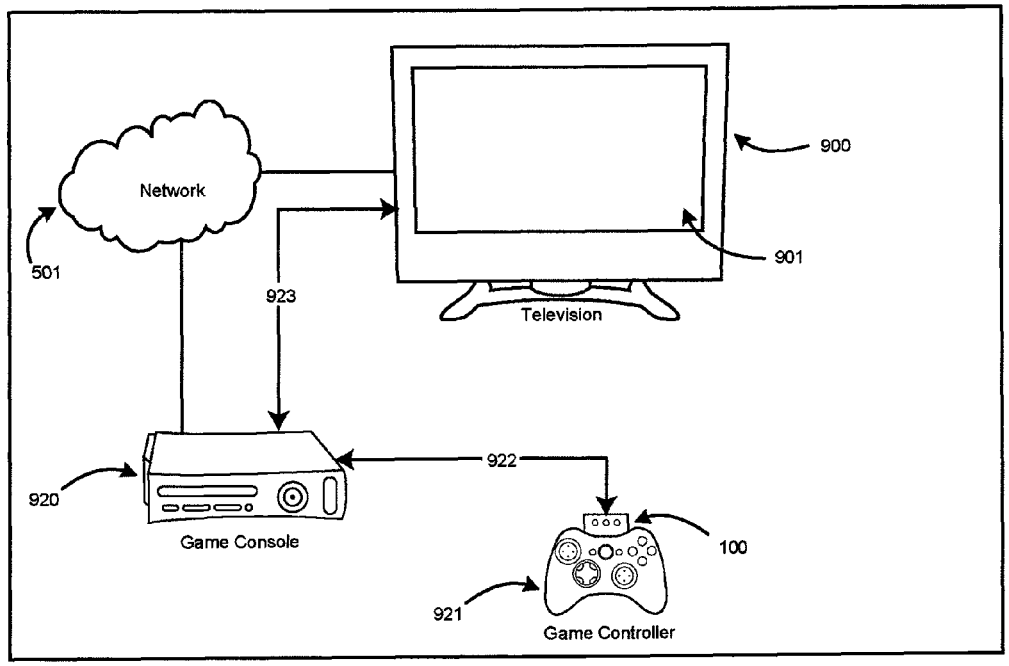
FIG. 12 is a diagram illustrating the interactions between various components, including the paging device and a gaming console according to yet other embodiments.

FIG. 11 is a pictorial diagram illustrating the interactions between various components of the system, including the paging device and a Television according to certain other embodiments. FIG. 12 is a pictorial diagram illustrating the interactions between various components of the system, including the paging device and a gaming console according to certain embodiments. As shown in FIGS. 11 and 12, the systems include a paging device 100, which may include the same components as illustrated and described in connection with FIG. 2. The system illustrated in FIGS. 11 and 12 may also include many of the components illustrated and described in connection with FIG. 1, such as the Paging NOC 300 and paging transmitter 350. In certain of these embodiments, paging device 100 may operate in a similar manner as described in connection with FIGS. 4 and 6.

As shown in FIG. 11 the system includes a television 900, which has an associated display 901. In certain embodiments, television 900 may be an Internet enabled television. In other embodiments, television 900 can be any other suitable type of television or visual display. The system also includes a remote 910, which communicates with television through a radio connection 601. Radio connection 601 can be any suitable type of connection, such as infrared, Bluetooth or WiFi. Paging device 100 is illustrated in FIG. 11 as being incorporated in remote 910. Any messages received by paging device 100, along with any message attributes and status notifications can be transmitted to television 900 through radio connection 601 between remote 910 and television 900. In other embodiments, paging device could be a separate device, or could be attached or connected to television 900, in which case, paging device 100 could communicate with television 900 through a direct radio connection or any other type of suitable connection as described in connection with FIG. 1.

In response to receiving a message from paging device 100, television 900 may display the message on display 901. Television 900 may also generate one or more visual or audible alerts, such as to indicate the receipt of the message, or may generate an audible output of the message through an attached speaker. As shown in FIG. 11, television 900 may include a network connection 501, which could be a wired or wireless Internet connection, or any other suitable type of network connection. In certain embodiments, television 900 can communicate with the paging network through network connection 501, in order to send certain acknowledgements and status notifications to the paging network as discussed in connection with FIGS. 5 and 7-8.

According to certain embodiments, the paging network may send emergency notifications to paging device 100, which may be displayed on display 901. In certain of these embodiments, the alerts could be used to turn on television 900 and may be displayed as an overlay or in a separate window on television 900 to alert the user to an emergency. In other embodiments, the paging network could send other notifications, such as reminders to paging device 100 for display on television 900. For example messages could be sent and displayed to remind users to take medications or to notify users of upcoming appointments.

As shown in FIG. 12 the system illustrated in FIG. 11 may also include a gaming console 920 and gaming controller 921. Gaming console 920 may be any standard type of gaming console, such as a Microsoft Xbox, Sony Playstation, or Nintendo Wii. Gaming Controller 921 may be any standard type of controller, such as a controller that is specific to gaming console 920 or a generic gaming controller. Gaming controller 921 may communicate with gaming console 920 through connection 922, which may be any standard wired or wireless connection. Likewise, gaming console 920 may communicate with television 900 through connection 923, which may be any standard wired or wireless connection. As shown in FIG. 12, in certain embodiments, gaming console 920 may include a network connection 501, which may be a wired or wireless Internet connection, or any other suitable type of network connection. In certain of these embodiments, gaming console 920 can communicate with the paging network through network connection 501, in order to send certain acknowledgements and status notifications to the paging network as discussed in connection with FIGS. 5 and 7-8.

As shown in FIG. 12, paging device 100 is incorporated in gaming controller 921. Any messages received by paging device 100, along with any message attributes and status notifications can be transmitted to gaming console 920 through connection 922 between gaming controller 921 and gaming console 920. Gaming console 920 may then pass the message and other information to television 900 for display as described in connection with FIG. 11. In other embodiments, paging device 100 could be a separate device, in which case, paging device 100 could communicate with television 900 in a similar manner as described in connection with FIG. 11. In yet other embodiments, paging device 100 could be attached or connected to gaming console 920, in which case messages and other information may be transferred from paging device 100 to gaming console 920 through a wired connection. In response to receiving a message, television 900 may display the message and may generate one or more alerts as described in connection with FIG. 11.

According to certain embodiments, the paging network may send emergency notifications to paging device 100. In certain of these embodiments, the alerts could be used to interrupt the game play on gaming console 920 in order to alert the player to an emergency. In other embodiments, the alert could be displayed as an overlay or in a separate window on display 901. In certain embodiments, the paging network may send other notifications to paging device 100. For example parents or guardians could use the system to send messages to the user of the gaming console, such as to instruct the user to stop playing the game.

According to certain other embodiments, the paging device may communicate messages to other electronic devices, such as laptops or personal computers. In certain of these embodiments, the paging device and the electronic device may operate in a manner similar to that described and illustrated in connection with FIGS. 1-8 above. For example, the paging device may communicate any messages it receives from a paging network to a laptop through a suitable connection, such as a radio or hardwired connection. The laptop could then display the message and transmit any acknowledgements or notifications to the paging network through a connection between the laptop and the paging network, such as an Internet connection.

It is understood that the various devices described in connection with the foregoing figures are exemplary, and any other suitable devices may be used. The foregoing is merely illustrative of the principles of this invention and various modifications can be made by those skilled in the art without departing from the scope and spirit of the invention. As an example, although certain embodiments of the paging device have been described in connection with having three LEDs with particular colors, the paging device could have any number of LEDs associated with any colors. One skilled in the art will appreciate that the present invention can be practiced in other than the described embodiments, which are presented for purposes of illustration and not limitation, and the present invention is limited only by the claims which follow.

What is claimed is:

1. A system for transmitting messages received from a paging network operations center to a cellular or other wireless device through short-range radio communication, the system comprising:
    a wireless device comprising a wireless device processor, a wireless device memory, a wireless device transceiver, and display circuitry; and
    a wireless device peripheral comprising:
        paging circuitry adapted to:
            receive data from the paging network operations center through a paging network, the received data including a message and one or more message attributes associated with the message;
        short-range RF circuitry; and
        a processor coupled to the paging circuitry and the short-range RF circuitry, the processor being adapted to:
            obtain the received data from the paging circuitry;
            process the received data to retrieve the message and the one or more message attributes, and to associate an error status with the message, the error status comprising an indicator based on whether an error was detected in the received data;
            transfer the processed data to the short-range RF circuitry, the processed data including the message, at least one of the one or more message attributes and the error status; and
        wherein, the short-range RF circuitry is adapted to transmit the processed data to the wireless device through a short-range radio connection; and
    wherein, in response to receiving the processed data at the wireless device, the wireless device processor is adapted to:
        cause the wireless device transceiver to transmit a receipt acknowledgement to the paging network operations center through a cellular or Internet connection, the receipt acknowledgement comprising a notification that the message was received and an error indication based on the error status;
        store the message, the at least one message attribute and the error status in the wireless device memory; and
        transfer the message to the display circuitry for display.

2. The system according to claim 1, wherein the short-range radio connection complies with a Bluetooth standard for wireless communications.

3. The system according to claim 1, wherein the wireless device peripheral is selected from the group consisting of a case, a cover, a key fob, an ID card holder and a battery extender.

4. The system according to claim 1, wherein the wireless device processor is further adapted to:
    detect whether the wireless device is able to receive messages from the paging network operations center through the wireless device peripheral; and
    cause, in response to detecting that the wireless device is unable to receive messages from the paging network operations center through the wireless device peripheral, the transceiver to transmit a connection notification to the paging network operations center through a cellular or Internet connection, the connection notification comprising an indication that the wireless device is unable to receive messages from the paging network operations center through the wireless device peripheral.

5. The system according to claim 4, wherein the wireless device processor is adapted to detect whether the wireless device is able to receive messages from the paging network operations center through the wireless device peripheral based, at least in part, on detecting whether the short-range radio connection has been established with the wireless device peripheral.

6. The system according to claim 4, wherein the wireless device processor is adapted to detect whether the wireless device is able to receive messages from the paging network operations center through the wireless device peripheral based, at least in part, on receiving a paging network connection notification from the wireless device peripheral, the paging network connection notification comprising an indication that the wireless device peripheral is able to receive data from the paging network operations center through the paging network.

7. The system according to claim 4, wherein, in response to transmitting the connection notification to the paging network operations center, the wireless device is adapted to receive data from the paging network operations center through a cellular or Internet connection, the data received through the cellular or Internet connection comprising one or more messages.

8. The system according to claim 4, wherein the transmission of at least one of the receipt acknowledgement and the connection notification to the paging network operations center enables the paging network operations center to select one or more networks through which to send messages, and wherein the one or more networks are selected from the group consisting of a paging network, a cellular network, a dedicated network, the Internet and a combination of two or more of a cellular network, a dedicated network and the Internet.

9. The system according to claim 1, wherein the wireless device further comprises a user interface and the wireless device processor is further adapted to:
    receive a read notification through the user interface, the read notification comprising an indication that the message has been read or acknowledged by a user of the wireless device; and
    cause, in response to receiving the read notification, the transceiver to transmit a read acknowledgement based on the read notification to the paging network operations center through a cellular or Internet connection.

10. The system according to claim 1, wherein the wireless device is adapted to receive a plurality of messages from the paging network operations center, each of the plurality of messages being received through at least one of a plurality of network connections, and wherein, in response to receiving a particular message from the plurality of messages, the wireless device processor is adapted to:
   detect whether the particular message matches one or more previously received messages stored in the wireless device memory; and
   transfer, in response to detecting that the particular message does not match a previously received message, the particular message to the display circuitry for display.

11. An apparatus for transmitting messages received from a paging network operations center to a cellular or other wireless device through short-range radio communication, the apparatus comprising:
   a processor;
   a memory coupled to the processor;
   short-range RF circuitry coupled to the processor; and
   paging circuitry coupled to the processor and adapted to:
      receive data from the paging network operations center through a paging network, the received data including a message and one or more message attributes associated with the message; and
      transfer the received data to the processor;
   wherein the processor is adapted to:
      process the received data to retrieve the message and the one or more message attributes and to associate an error status with the message, the error status comprising an indicator based on whether an error was detected in the received data;
      store the message, the one or more message attributes and the error status in the memory; and
      transfer the processed data to the short-range RF circuitry, the processed data including the message, at least one of the one or more message attributes and the error status; and
   wherein the short-range RF circuitry is adapted to transmit the processed data to a wireless device through a short-range radio connection to enable the wireless device to display the message and transmit a receipt acknowledgement to the paging network operations center through a cellular or Internet connection, the receipt acknowledgement comprising a notification that the message was received and an error indication based on the error status.

12. The apparatus according to claim 11, wherein the processor and one of the short-range RF circuitry and the paging circuitry are integrated within a single chip.

13. The apparatus according to claim 11, wherein the processor comprises decode circuitry adapted to process the received data to retrieve the message and the one or more message attributes and to associate an error status with the message, and wherein the decoding circuitry and the paging circuitry are integrated within a single chip.

14. The apparatus according to claim 11, wherein the short-range radio connection complies with a Bluetooth standard for wireless communications.

15. The apparatus according to claim 11, wherein the processor is further adapted to:
   detect whether the paging circuitry is able to receive messages from the paging network operations center through the paging network; and
   cause, in response to detecting that the paging circuitry is unable to receive messages from the paging network operations center, the short-range RF circuitry to transmit a paging network connection status to the wireless device through the short-range radio connection, the paging network connection status comprising an indication that the apparatus is unable to receive messages from the paging network operations center through the paging network.

16. The apparatus according to claim 15, wherein the transmission of the paging network connection status to the wireless device enables the wireless device to:
   transmit a connection notification based on the paging network connection status to the paging network operations center through a cellular or Internet connection; and
   receive, in response to transmitting the connection notification, data from the paging network operations center through the cellular or Internet connection, the data received through the cellular or Internet connection comprising one or more messages.

17. The apparatus according to claim 11, wherein the apparatus comprises at least one alert mechanism, the at least one alert mechanism being adapted to generate one or more tactile, visual or audible alerts selected from the group consisting of a battery power alert, a new message alert and a wireless device connection alert.

18. The apparatus according to claim 11, wherein the at least one message attribute is selected from the group consisting of a timestamp, a unique identifier and an address to which the message was transmitted.

19. The apparatus according to claim 11, wherein the apparatus is associated with a plurality of message addresses, wherein the at least one message attribute comprises an address to which the message was transmitted, the address being one of the plurality of message addresses, and wherein the transmission of the at least one message attribute to the wireless device enables the wireless device processor to cause the message to be displayed based, at least in part, on the address to which the message was transmitted.

20. The apparatus according to claim 11, wherein the memory stores one or more previously received messages, and wherein the processor is adapted to:
   detect whether the message matches any of the one or more previously received messages; and
   transfer, in response to detecting that the message does not match any of the one or more previously received messages, the processed data to the short-range RF circuitry.

21. A method for processing messages sent from a paging network operations center to a paging device and transmitted to a cellular or other wireless device through short-range radio communication, the method being implemented through instructions that cause a cellular or other wireless device to perform the steps of:
   receiving processed data from the paging device through a short-range radio connection, the processed data comprising a message, one or more message attributes associated with the message, and an error status, wherein the message and the one or more message attributes are based on paging data received by the paging device from the paging network operations center through a paging network, and wherein the error status comprises an indicator based on whether an error was detected in the paging data;
   transmitting a receipt acknowledgement to the paging network operations center through a cellular or Internet connection, the receipt acknowledgement including a notification that the message has been received and an error notification based on the error status;

storing the message, the one or more message attributes and the error status; and displaying the message.

22. The method according to claim 21, wherein the short-range radio connection complies with a Bluetooth standard for wireless communications.

23. The method according to claim 21, wherein the error notification comprises an indication that the message includes one or more errors and wherein the steps further comprise receiving, in response to transmitting the receipt acknowledgement, retransmitted data comprising a retransmitted message, the retransmitted message including content that is substantially similar to the content of the message.

24. The method according to claim 21, wherein the steps further comprise:

detecting whether the wireless device is able to receive messages from the paging network operations center through the paging device; and transmitting, in response to detecting that the wireless device is unable to receive messages from the paging network operations center through the paging device, a connection notification to the paging network operations center through a cellular or Internet connection, the connection notification comprising an indication that the wireless device is unable to receive messages from the paging network operations center through the paging device.

25. The method according to claim 24, wherein the step of detecting comprises detecting whether the wireless device is able to establish a short-range radio connection with the paging device.

26. The method according to claim 24, wherein the step of detecting comprises receiving a paging network connection notification from the paging device, the paging network connection notification comprising an indication based on whether the paging device is able to receive data from the paging network operations center through the paging network.

27. The method according to claim 24, wherein, the steps further comprise receiving, in response to transmitting the connection notification to the paging network operations center, data from the paging network operations center through a cellular or Internet connection, the data received through the cellular or Internet connection comprising one or more messages.

28. The method according to claim 21, wherein the wireless device includes a user interface and the steps further comprise:

Receiving a read notification through the user interface, the read notification comprising an indication that the message has been read or acknowledged by a user of the wireless device; and transmitting, in response to receiving the read notification, a read acknowledgement to the paging network operations center through a cellular or Internet connection, the read acknowledgement comprising an indication that the message has been read.

29. The method according to claim 21, wherein the wireless device includes a user interface, and wherein the step of displaying the message comprises causing the user interface to display the message through an output selected from the group consisting of an audio output, a visual output, a tactile output and a combination of at least two of an audio output, a visual output, and a tactile output.

30. The method according to claim 21, wherein the wireless device includes a memory storing one or more previously received messages, wherein the steps further comprise detecting whether the message matches any of the one or more previously received messages, wherein the step of storing the message comprises storing, in response to detecting that the message does not match any of the one or more previously received messages, the message, the one or message attributes and the error status, and wherein the step of displaying the message comprises displaying, in response to detecting that the message does not match any of the one or more previously received messages, the message.

* * * * *